United States Patent [19]
Matsui

[11] Patent Number: 5,886,342
[45] Date of Patent: Mar. 23, 1999

[54] IMAGE READER AND DOCUMENT CURVATURE MEASUREMENT USING VISIBLE AND INFRARED LIGHT

[75] Inventor: Toru Matsui, Nara, Japan

[73] Assignee: Matsushita Electric Industrial Co., Ltd., Osaka, Japan

[21] Appl. No.: 834,858

[22] Filed: Apr. 10, 1997

[30] Foreign Application Priority Data

Apr. 12, 1996 [JP] Japan ..................... 8-090862

[51] Int. Cl.⁶ .......................... G01L 27/00; G02B 27/28; G02B 5/30
[52] U.S. Cl. ................. 250/208.1; 358/474; 358/493
[58] Field of Search ................... 250/208.1, 216, 250/234–236; 356/377; 358/486, 488, 491, 493, 494, 496–498, 471, 474

[56] References Cited

U.S. PATENT DOCUMENTS

| | | | |
|---|---|---|---|
| 5,084,611 | 1/1992 | Okisu et al. ................. | 250/208.1 |
| 5,705,806 | 1/1998 | Matsuda et al. ............. | 250/208.1 |
| 5,760,925 | 6/1998 | Saund et al. ................. | 358/474 |
| 5,764,379 | 6/1998 | Matsuda et al. ............. | 358/474 |

*Primary Examiner*—Stephone B. Allen
*Attorney, Agent, or Firm*—McDermott, Will & Emery

[57] ABSTRACT

This invention relates to an image reader capable of reading document images in parallel with the measurement of the state of curvature of the document surface, and correcting image distortion caused by said curvature in real time. An illumination light source for reading documents is provided with a filter to separate infrared light and visible light. The visible light is used to read document image information, and the infrared light is used to measure the state of curvature of the document. Since document reading and document curvature measurement are accomplished using light having different characteristics, these operations can be accomplished simultaneously.

30 Claims, 11 Drawing Sheets

IMAGE READER AND DOCUMENT CURVATURE MEASUREMENT USING VISIBLE AND INFRARED LIGHT

BACKGROUND OF THE INVENTION

1. Field of the Invention

The present invention relates to an improved image reader for reading bound documents such as books, magazines and the like.

2. Description of the Related Art

Image reading devices have been commercialized as so-called book scanners. In this device, an image sensing unit is disposed above a document platen, and an open space comprising a height of several tens of centimeters is maintained between the document platen and the image sensing unit. When reading a bound document such as a book or magazine (hereinafter referred to as "book document"), a user sets a book document on the document platen in an open-faced state facing upward. When the start key is turned ON, scanning of the document surface (surface to be read) begins, and the read image is sequentially output to an external device in parallel with the scanning. If the external device is a printer, a reproduced image is formed in real time.

When a book scanner is used, the operation of reading a book document comprising a plurality of pages is accomplished with improved efficiency because the pages can be turned on the document platen. Furthermore, damage to the book is markedly reduced compared to when a book is placed in an open faced state facing downward. The aforesaid book documents include filed documents.

Unlike sheet documents, book documents often have a curved document surface. When the document surface is curved, the read image is distorted in accordance with the state of curvature. When outputting a read image to an external device, it is necessary that the read image is corrected for distortion, i.e., to output a read image having an image quality similar to a sheet image.

The slit optical projection method (hereinafter referred to as "optical section method") used for three-dimensional measuring is one measuring method used to measure the state of curvature of a document surface. This method exposes an object surface to slit light (a light beam having a linear cross section), projects the object surface from a direction different from the exposure direction of the slit light, and checks the shape of the exposed slit light, and is capable of high precision measurement. If the object surface is flat, the exposure portion is linear, whereas the exposure portion is a curve when the exposure surface is curved. Similar measurement can be accomplished by scanning the document surface with a spot light instead of slit light.

In conventional book scanning, a special measurement light source is provided, and curved conditions are measured by slit light of the visible band. Correction of a read image is accomplished based on these measurement results (U.S. patent application Ser. No. 5,084,611).

When reading a document image, the document surface must be illuminated by visible light. Conventionally, reading of a document image and measurement of the state of curvature cannot be accomplished simultaneously because visible light is used to measure the state of curvature as mentioned above. These two operations cannot be accomplished simultaneously because the slit light is nullified by the aforesaid illumination. Therefore, reading of a document image is accomplished after the state of curvature has been measured, which is disadvantageous inasmuch as a long time is required to read a single page. A further disadvantage is that suitable distortion correction cannot be achieved when the state of curvature changes after curvature measurement has been accomplished.

In addition, since the state of curvature of both pages of an open faced book document is measured, a special measurement light source is provided separately as an illumination light source, thereby increasing the size of the book scanner.

SUMMARY OF THE INVENTION

An object of the present invention is to provide an image reader capable of reading a document image and measuring the state of curvature of the document image in parallel operations, and correcting the image distortion accompanying said curvature of the document image in real time.

A further object is to provide a compact image reader.

These objects are achieved by providing an image reader comprising:

document platen to support a document to be read;

image sensing means to convert a document image to electrical signals;

light source to emit visible light and infrared light;

optical filter to block infrared light;

illumination means to illuminate the entire reading area of a document surface with visible light;

infrared illumination means to direct the infrared light emitted from said light source to said document surface to measure the state of curvature of said document surface;

photosensor unit to detect the height of the surface illuminated by infrared light in said reading area; and image processing means to correct an image read by said image sensing means in accordance with the height of the illuminated surface detected by said photosensor unit.

The aforesaid image sensing means is provided with an image sensing device and an image sensing lens to form a document image on a photoreceptor surface of said image sensing device, and a mirror disposed between said image sensing device and said image sensing lens to transmit visible light and reflect infrared light, so as to direct the infrared light emitted from said light source to said document surface via said image sensing lens.

The aforesaid photosensor unit is provided with at least three photosensors provided at each division area of a divided reading area in a single direction, and wherein the detection resolution of the center reading area is higher than that of the other areas.

The aforesaid optical filter is provided with a slit-like window to transmit infrared light, so as to direct infrared light emitted from said infrared illumination means transmitted through said window to said document surface.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
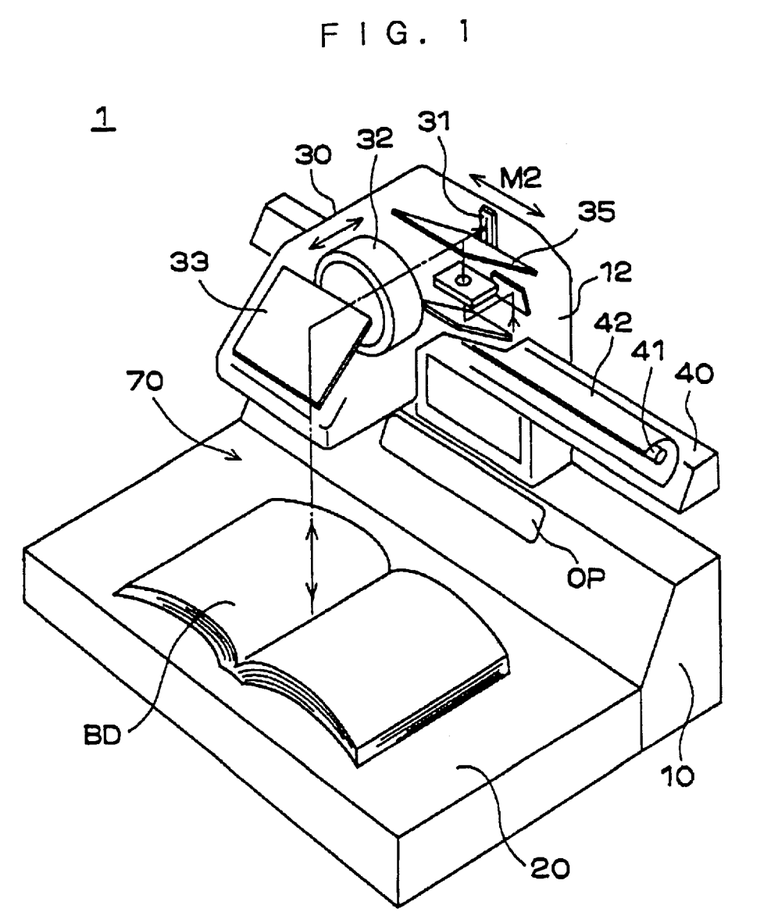
FIG. 1 is a perspective view of the exterior of a book scanner.

Book scanner 1 comprises a housing 10 to accommodate electrical circuits and the like, document platen 20 of a dark color to support a book document, image sensing unit 30 to convert a document image to electrical signals, and a lamp unit 40 to illuminate the book document. Document platen 20 is disposed at the front side of housing 10. Image sensing unit 30 is arranged above document platen 20, and is supported in an overhanging configuration by column 12 extending upward from the top surface of housing 10. Lamp unit 40 comprises a straight tube type lamp 41 and reflector 42, and is disposed at a position below image sensing unit 30, and is fixedly attached to column 12. An open space 70 is provided between document platen 20 and image sensing unit 30 so as to be open to the outside of the apparatus, and said open space 70 is sufficiently large to accommodate placement of book documents. The distance between document platen 20 and image sensing unit 30 is 30 cm or more. An operation panel OP is provided at the top of housing 10, and optical members (described later) are incorporated within column 12 to measure the state if curvature of the document surface.

In FIG. 1, image sensing unit 30 is provided with a line sensor 31 comprising a charge-coupled device (CCD) array, image forming lens 32, mirror 33, and filter mirror 35 to reflect infrared light. Visible light reflected from the document surface is reflected by mirror 33, then transmitted through image forming lens 32 and filter mirror 35, and impinges the photoreceptor surface of line sensor 31. Image forming lens 32 is provided so as to be movable in forward-and-backward directions, and is positioned via an AF mechanism not shown in the drawings. Line sensor 31 is mounted on a movable body comprising a scanning mechanism not shown in the drawings, and is moved in horizontal directions along lateral direction (subscan direction) M2 in a state wherein the array direction of the CCD elements is maintained in a vertical direction. That is, in book scanner 1, a two-dimensional imaging plane is formed via the movement of line sensor 31. When an area sensor is used instead of line sensor 31, the photoreceptor surface becomes the image sensing plane. The main scan direction of the document image is the front-to-back direction on the document platen 20, and the vertical direction on the image sensing plane.

Book scanner 1 of the aforesaid construction is an image input means suitable for reading book documents BD. A complete copying system suitable for various types of documents can be constructed by combining book scanner 1 with a digital copying apparatus.

When using book scanner 1, a user places an open book document BD face upward on document platen 20. At this time, the border between the right and left pages is aligned with the center of document platen 20 in a lateral direction. Since the document surface of book document BD is curved compared to a sheet document, it is necessary to correct the image distortion corresponding to said curvature. It is also necessary to adjust the imaging focus. Therefore, measurement of the state of curvature of the document surface (hereinafter referred to as "curvature measurement") can be accomplished in parallel with the reading of the document image (e.g., scanning). Reading modes include a batch reading mode wherein both right and left pages are read, and individual reading mode wherein each right and left page is read separately.

Figure 2:
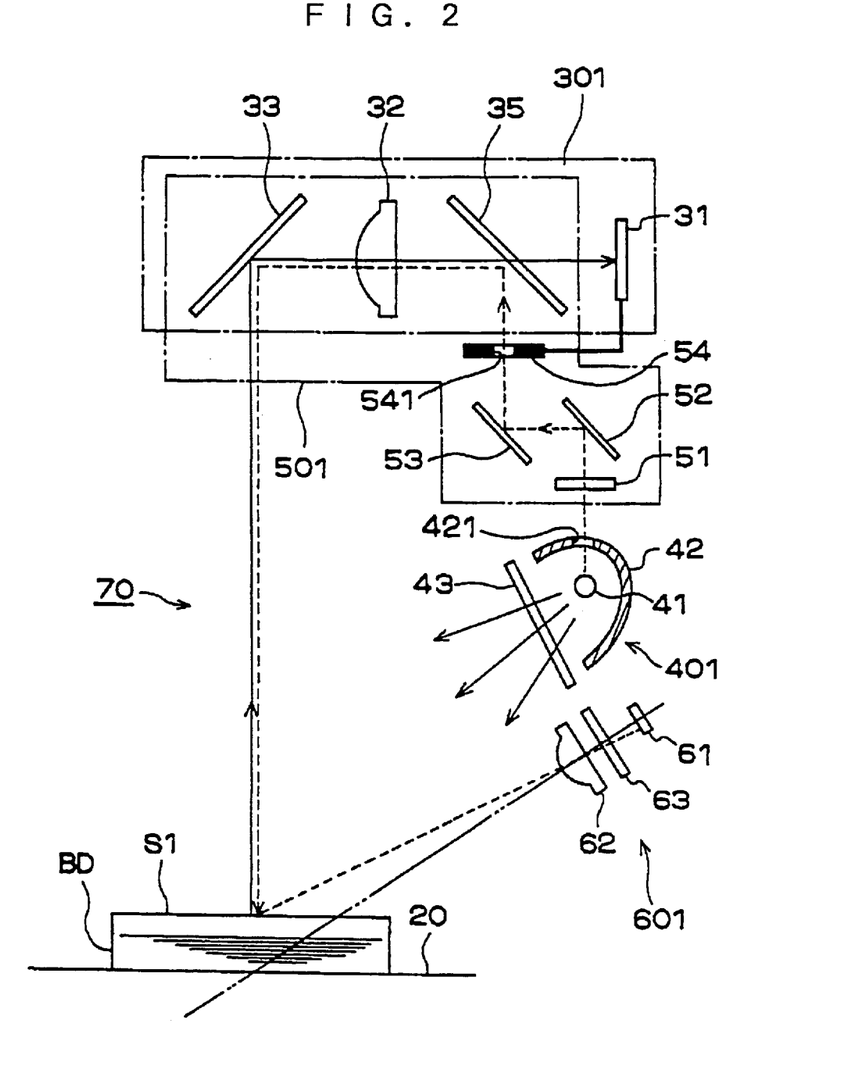
FIG. 2 shows the optical unit of the book scanner.

FIG. 2 shows the optical unit of book scanner 1.

The optical unit comprises image sensing unit 301, illumination unit 401, infrared illumination unit 501, and infrared detection unit 601. The infrared illumination unit 501 and infrared detection unit 601 essential elements for curvature measurement via infrared light.

The lamp 41 of illumination unit 401 is a light source sufficiently large emission intensity in the visible light range and infrared light range. The light emitted from lamp 41 is deflected toward document platen 20 by reflector 42. The illumination light of a document is visible light because an infrared filter 43 is provided on the front surface of reflector 42. Illumination unit 401 is designed so as to be capable of uniformly illuminating a document surface S1 of a maximum readable size.

A transmission hole 421 is formed on the top of reflector 42, and a filter 51 is disposed above transmission hole 421 to block visible light. In the light emitted from lamp 41 and transmitted through the transmission hole 421, only the infrared light passes through the filter 51, and is reflected by two mirrors 52 and 53 to impinge the filter mirror 35. Filter mirror 35 is disposed between the image forming lens 31 and line sensor 31. The infrared light reflected by filter mirror 35 is condensed by image forming lens 32, and directed toward the document surface S1 by mirror 33.

A movable light shield 54 having a pinhole 541 is provided in the optical path of the infrared light, specifically between the filter mirror 35 and mirror 53. This pinhole 541 regulates the spot diameter of the infrared light on the document surface S1. Light shield 54 is connected to line sensor 31 and moves in the subscan direction. The position of pinhole 541 is maintained at a position optically equivalent to the center of the element array of line sensor 31. That is, the center element of line sensor 31 and the pinhole 541 correspond to the same point on document surface S1. The spot of infrared light also moves in the subscan direction in conjunction with the movement of light shield 54. At this time, the spot is present on the scan line projected on line sensor 31.

The position (height) of the spot of infrared light locally illuminating the document surface S1 is detected by infrared detection unit 601. Infrared detection unit 601 comprises a photoelectric conversion device 61, lens 62, and visible light cutoff filter 63, and is disposed so that the optical axis of the lens 62 is in an inclined direction relative to the incidence direction of the infrared light approaching document surface S1. Photoelectric conversion device 61 (e.g., area sensor) is a device capable of detecting the received light distribution on the photoreceptor surface, such as a position sensor type device (PSD) image sensing device. The position of the spot of infrared light on the photoreceptor surface of photoelectric conversion device 61 changes in accordance with the height of document surface S1. Since the positional relationship between the photoelectric conversion device 61 and document platen 20 is known beforehand, the height of the document surface S1 can be determined based on the output of photoelectric conversion device 61 using a well-known triangulation measurement method. Curvature measurement is accomplished by detecting the height of document surface S1 at a plurality of points. If the height of document surface S1 is determined, the distance between document surface S1 and mirror 33 can be readily determined, such that the image sensing focus can be adjusted by moving the image forming lens 32 in accordance with said distance.

As can be readily understood from the above description, lamp 41 is used jointly for both illumination and curvature measurement. Thus, the book scanner 1 can be designed more compactly compared to when a special measurement light source is provided. Furthermore, the three optical components of mirror 33, image forming lens 32, and filter mirror 35 are essential structural elements common to image sensing unit 301 and infrared illumination unit 501. Using the image forming lens 32 used in image sensing to condense the infrared light allows use of a smaller spot of infrared light and provides high precision in positioning, and also allows high precision measurement of the state of curvature.

Figure 3:
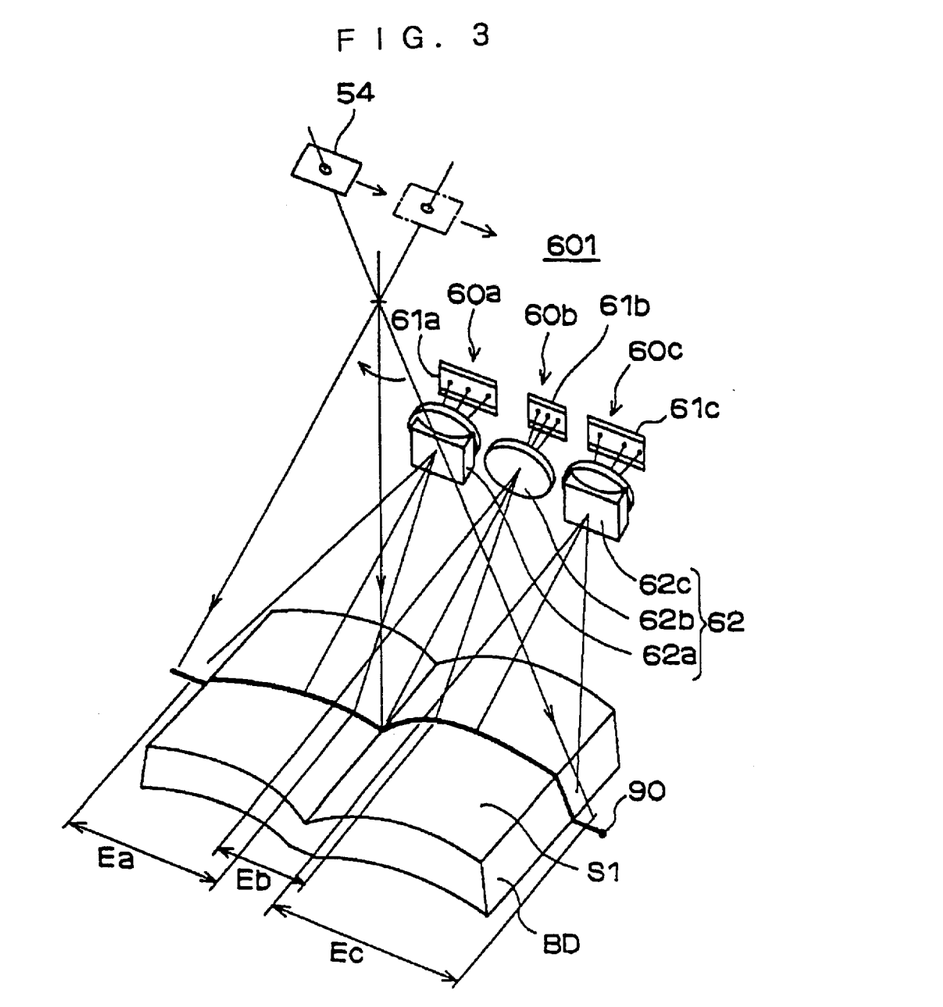
FIG. 3 is a perspective view showing the construction of the infrared detection unit of FIG. 2.

FIG. 3 is a perspective view showing the construction of infrared detection unit 601 of FIG. 2.

Infrared detection unit 601 comprises three sensor blocks 60a, 60b, 60c arrayed along the subscan direction, such that the detection resolution at the center of the reading area on document platen 20 is higher than the other areas. That is, each of the sensor blocks 60a, 60b, 60c are provided so as to receive the infrared light from the mutually different areas among areas Ea, Eb, Ec of the reading area, and each of the sensor blocks 60a, 60b, 60c are designed such that the dimensions in the subscan direction of the area Eb corresponding to the center sensor block 60b are smaller than the areas Ea and Ec on either side thereof. The areas Ea, Eb, and Ec the sections of the reading area divided along the subscan direction. The light receiving areas of sensor blocks 60a, 60b, 60c are set so as to overlap adjacent areas to avoid producing undetectable regions.

The user is warned when a document has an unusual shape so as to produce undetectable regions.

The spot 90 of infrared light moves in the subscan direction in conjunction with the movement of the light shield 54, as shown in FIG. 3. When the document surface S1 is curved, the track of spot 90 projected on the photoelectric conversion devices 61a, 61b, 61c of sensor blocks 60a, 60b, 60c is also curved.

In general, in book document BD, the height of the document surface changes abruptly in the binding region near the border between right and left pages, and focus adjustment and correction of image distortion can be accomplished with high accuracy by increasing the resolution at the binding region. In contrast, because the change in the height of the document surface changes gradually at areas outside the binding region, relatively low resolution is adequate, and it is desirable to enlarge the detection area as much as possible to be suitable for large size documents.

Figure 4:
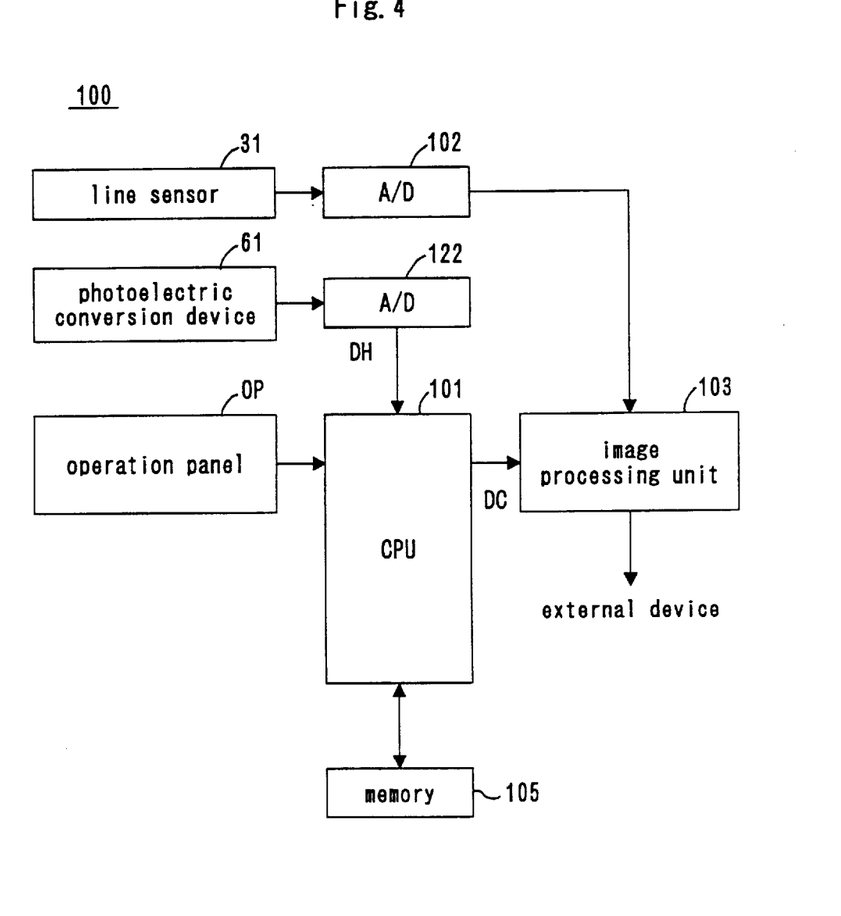
FIG. 4 is a block diagram of the essential portion of the signal processing unit of the book scanner.

FIG. 4 is a block diagram showing the essential portion of image processing unit 100 of book scanner 1.

The output of photoelectric conversion device 61 is converted to height data DH of a predetermined number of bits via and analog-to-digital (A/D) converter 122, then said data are input to central processing unit (CPU) 101. CPU 101 calculates the height of document surface S1 at various points marking small divisions of the subscan range based on the aforesaid height data DH, and generates curvature data DC for use in image distortion correction and image density correction. These curvature data DC are transmitted to the image processing unit 103.

On the other hand, the output of line sensor 31 is converted to, for example, 8-bit image data by A/D converter 102, and said data are input to the image processing unit 103. Image processing unit 103 executes shading correction to correct uneven illumination of the document surface, MTF (modulation transfer function) correction to improve image quality, and correction of image distortion caused by the curvature of document surface S1 based on the aforesaid curvature data DC. Image distortion correction is a process for correcting a read image to an image assuming the document surface S1 is flat. Specifically, a flat plane at a position a uniform distance (e.g., 5 cm) above document platen 20 in the main scan direction is designated a reference plane, and pixels corresponding to the height difference between said reference plane and the document surface S1 are variable magnified at various positions in the subscan direction. In the subscan direction, the image is variably magnified in accordance to the ratio of the surface distance of document surface S1 at each small section and the distance of each small section of the projected image of the document surface on document platen 20. Image data subjected to predetermined image processing are output to an external device such as a copier or printer.

CPU 101 controls the drive units including the sensor drive units, lens drive units, and lamp drive units. Connected to CPU 101 are memory 105 which comprises the control work area, operation panel OP and the like.

Figure 5:
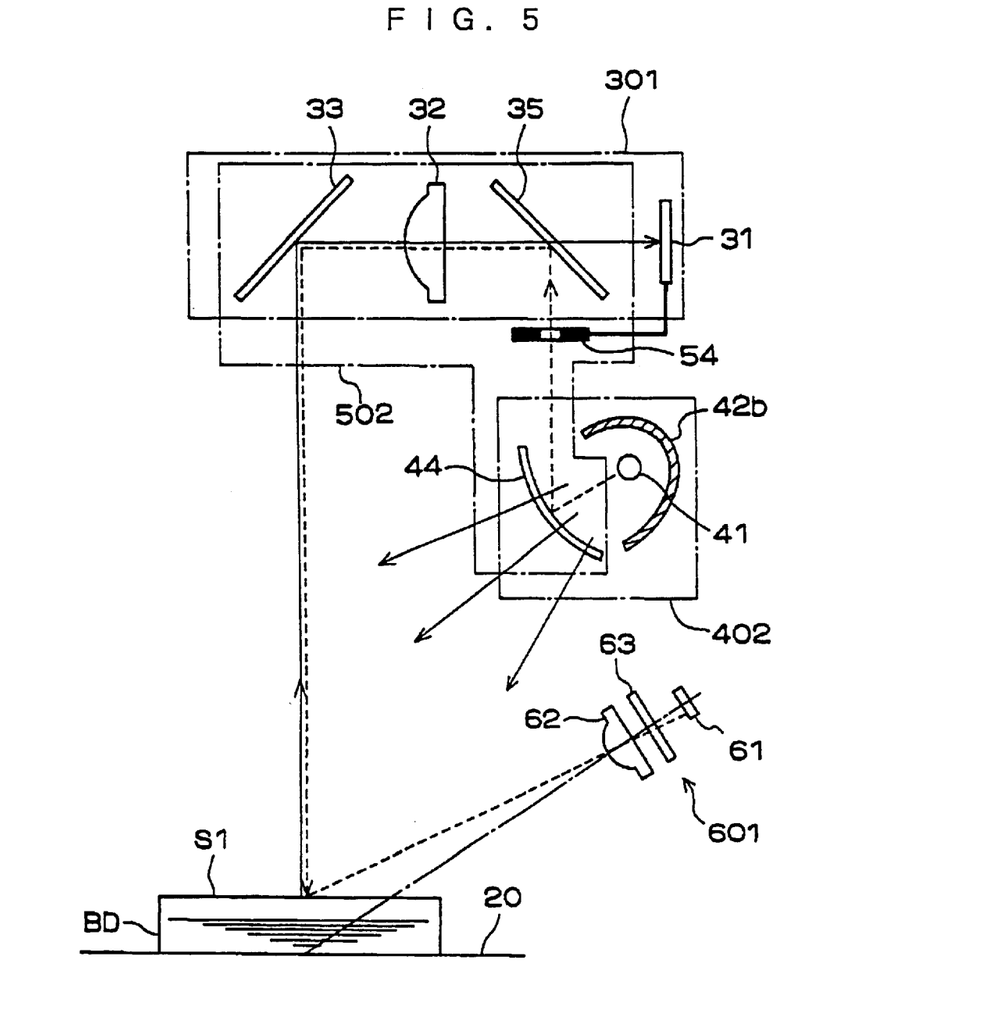
FIG. 5 shows an optical unit of a second embodiment.

FIG. 5 shows the optical unit of a second embodiment. In FIG. 5, structural elements having function similar to those in FIG. 2 are designated by like reference numbers. In the following drawings, like parts are designated by like reference numbers.

In the example of FIG. 5, a filter mirror 44 is provided on the front side of lamp 41 to reflect infrared light and transmit visible light. The reflective surface of filter mirror 44 is optically curved so as to condense infrared light and direct it to filter mirror 35. Filter mirror 44 is an optical component common to both illumination unit 402 and infrared illumination unit 502. The amount of infrared light used in curvature measurement is increased by condensing said light via filter mirror 44, thereby increasing the emission efficiency of lamp 41.

Figure 6:
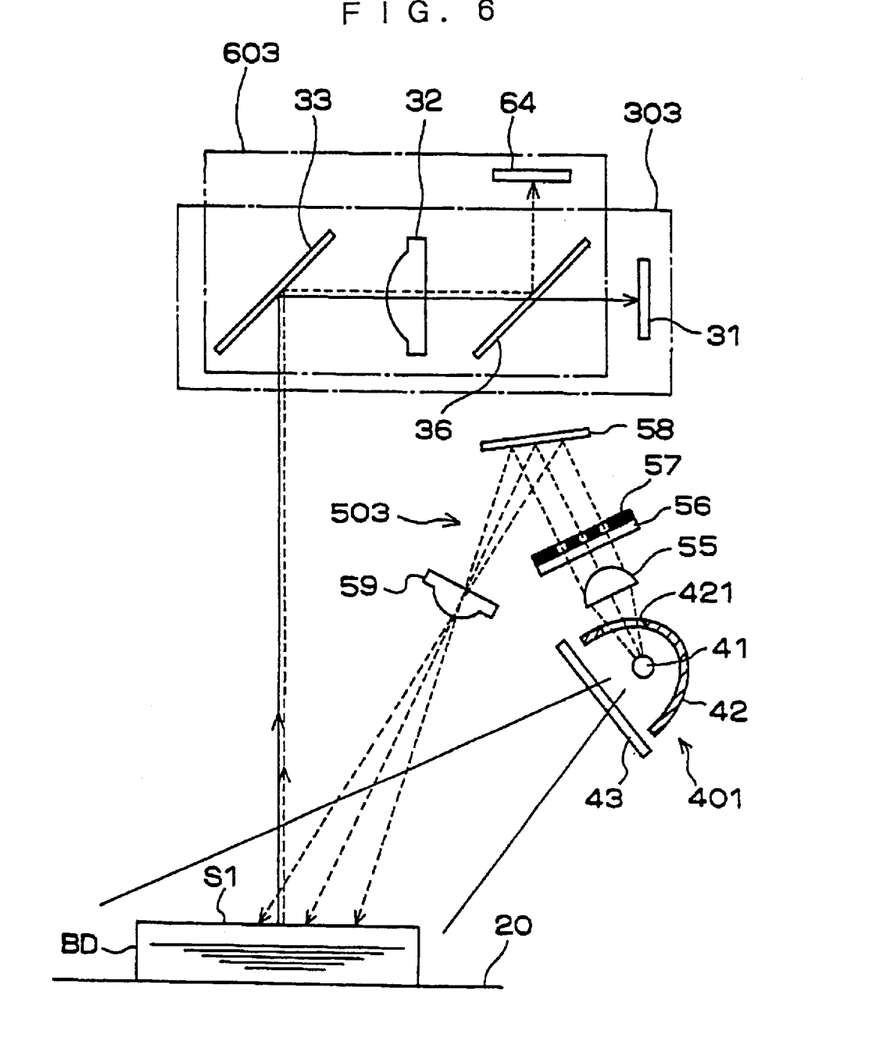
FIG. 6 shows an optical unit of a third embodiment.

FIG. 6 shows an optical unit of a third embodiment.

In the example of FIG. 6, the projection of infrared light used for curvature measurement is accomplished by a lens 59 which is separate from the image forming lens 32 used for image sensing, and an image forming lens 32 is used to detect infrared light. The curvature measurement method is the slit projection method.

The light passing through transmission hole 421 of reflector 42 is condensed by condenser lens 55 and directed to mirror 58. The light reflected by mirror 58 passes through lens 59 and impinges the document surface S1. A visible light cutoff filter 56 and a mask 57 which produces three slit lights are arranged between condenser lens 55 and mirror 58. Mask 57 is disposed on focal plane of lens 59. Thus, three light beams are exposed on the document surface S1. The infrared illumination unit 503 comprises condenser lens 55, filter 56, mask 57, mirror 58, and lens (cylindrical lens) 59.

The illumination light (visible light) and slit light (infrared light) reflected by the document surface S1 are directed to filter mirror 36 via mirror 33 and image forming lens 32. Visible light is transmitted through filter mirror 36 and impinges lines sensor 31. Infrared light is reflected by filter mirror 36 and impinges image sensing device (e.g., line sensor) 64. When a line sensor is used as image sensing device 64, the image sensing device 64 is moved in the subscan direction in conjunction with line sensor 31. Mirror 33, image forming lens 32, and filter mirror 36 are optical components common to image sensing unit 303 and infrared detection unit 603.

Figure 7:
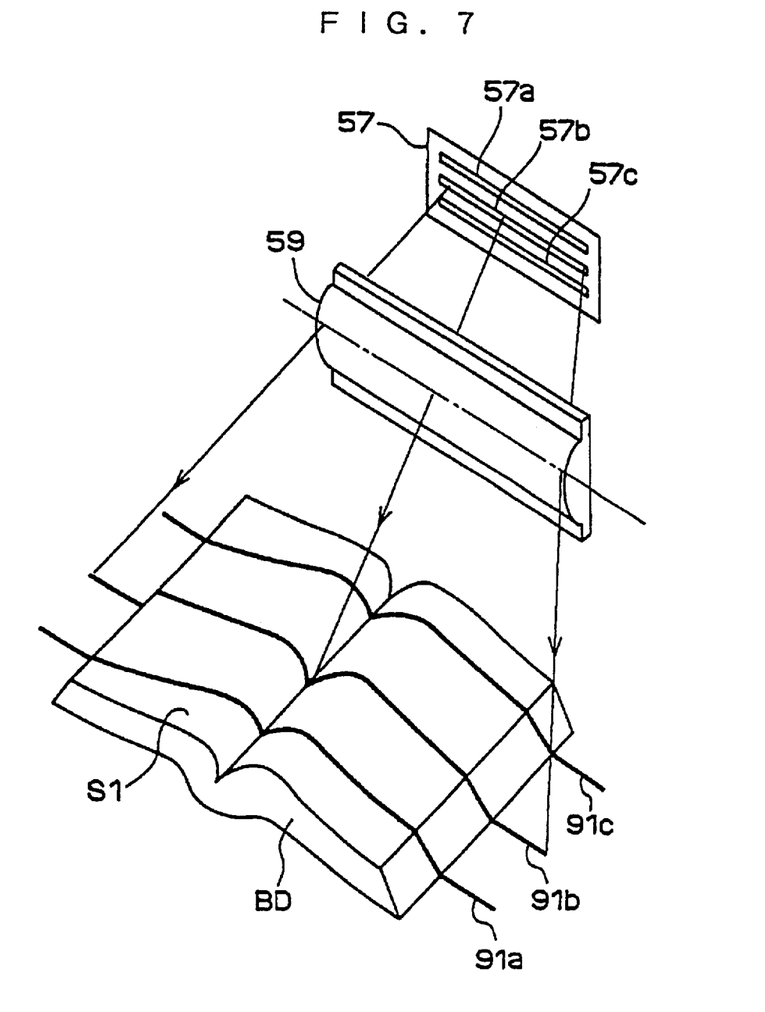
FIG. 7 is a perspective view showing the state of illumination by slit light corresponding to FIG. 6.

FIG. 7 is a perspective view showing the illumination state of the slit light corresponding to FIG. 6.

Mask 57 is provided with three transmission slits 57a, 57b, 57c extending in the subscan direction. Luminance lines 91a, 91b, 91c of the infrared light projected through these three transmission slits 57a, 57b, 57c appear on the document surface S1. Using three slit beams for illumination, the incline of a document can be measured, for example, by comparing the position of the center of the document determined from measurement data of each beam. When calculating the incline, a photoreceptor device is provided for each luminance line 91a, 91b, 91c, and averaging the output of each device, or determining the weighted mean of each output by giving greater weight to the center luminance line 91b.

Figure 8:
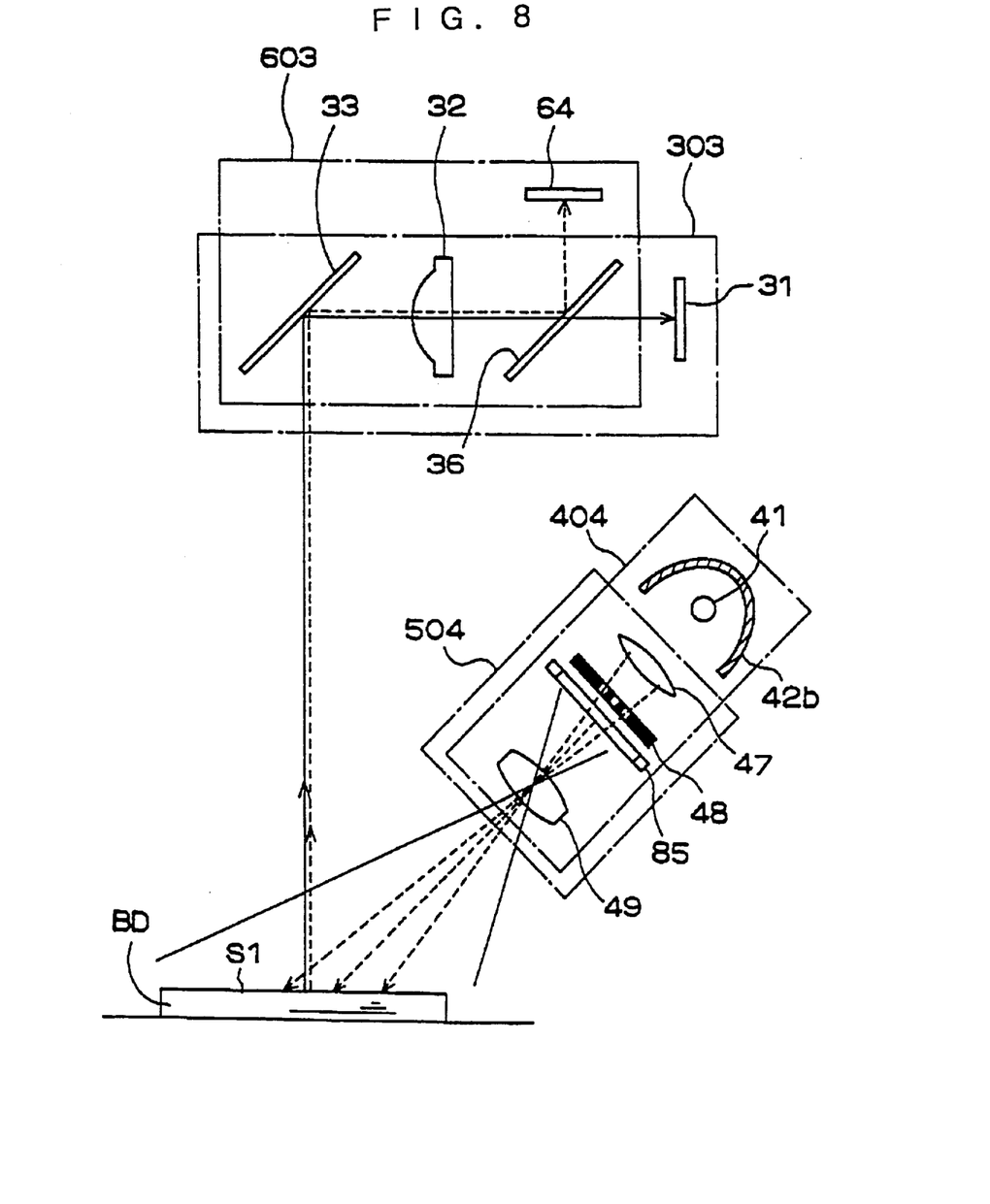
FIG. 8 shows an optical unit of a fourth embodiment.
Figure 9:
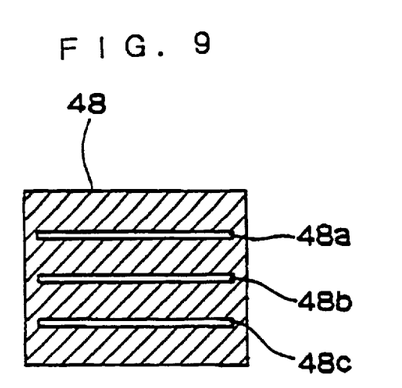
FIG. 9 is a plan view of the filter of FIG. 8.

FIG. 8 shows an optical unit of a fourth embodiment. FIG. 9 is a plan view of filter 48 of FIG. 8.

The light emitted from lamp 41 is directed to lens 47 directly or is reflected by reflector 42b and directed to lens 47. The light condensed by lens 47 impinges filter 48 disposed at the focal position of projection lens 49. Filter 48 is an infrared cutoff filter having windows three slit-like 48a, 48b, 48c to transmit infrared light as shown in FIG. 9. A liquid crystal panel 85 is provided in front of filter 48 to set the effective range of illumination by visible light. In the example of FIG. 8, curvature measurement is accomplished by a slit projection method wherein three slit beams illuminate the document surface S1, similar to that in the example of FIG. 6. Infrared illumination unit 504 comprises lens 47, filter 48, liquid crystal panel 85, and projection lens 49, and illumination unit 404 comprises infrared illumination unit 504 and reflector 42b. The reading range can be specified (edited) by a user setting nontransparent portions of liquid crystal panel 85. That is, unilluminated dark areas of a read image can be eliminated by image processing.

Figure 10A:
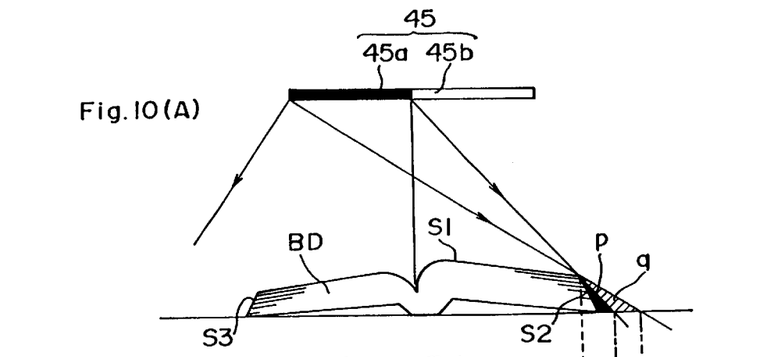
FIGS. 10(a), 10(b), 10(c) illustrate the method of detecting the base of a book document.
Figure 10B:
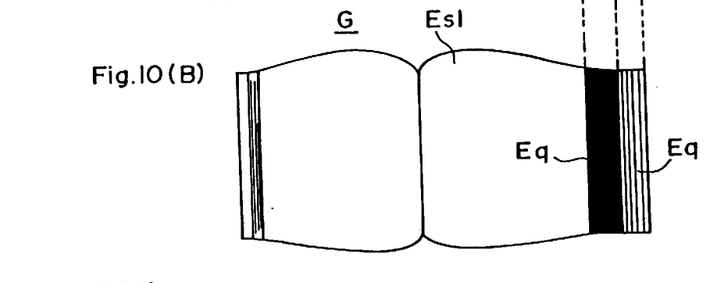
Figure 10C:
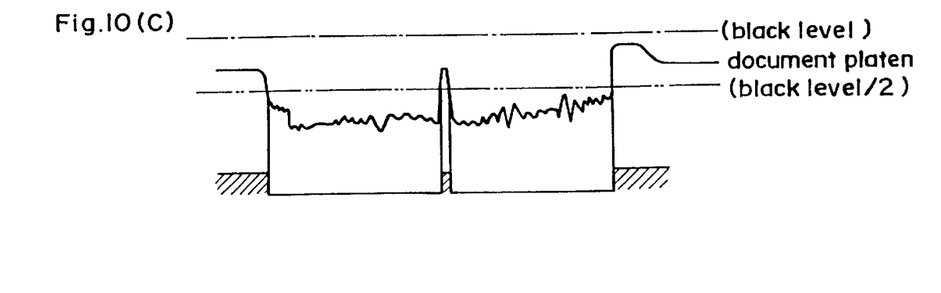

FIG. 10 illustrate the method of detecting the base of book document BD.

If a protrusion on the surface of book document BD is detected by the slit light, the document surface S1 and the side surface (hereinafter referred to as the "base") S2 of book document BD can be determined. Furthermore, the base S2 can be detected by using the difference in the illumination condition. FIG. 10 illustrates the latter detection method.

In FIG. 10, the illumination light source 45 comprises two lamps 45a and 45b capable of independent ON/OFF control. The description below pertains to detection of base S2 on the right side of the drawing.

Right side lamp 45a is lighted, and left side lamp 46b is maintained in the OFF state. Thus, a main shadow p and semishadow q are formed at the right edge of document surface S1. When book document BD is sensed in this state, the read image G is an image comprising bright area Es1 corresponding to document surface S1, and dark areas Ep and Eq having densities which reflect the illumination condition of main shadow p and semishadow q, as shown in FIG. 10b. FIG. 10C shows the density distribution in the subscan direction of read image G. The border between bright area Es1 and dark area Ep corresponding to main shadow p can be determined by using the difference in densities of said areas, such that the top edge of base S2 (i.e., right edge of document surface S1) can be detected. Accordingly, the unnecessary areas of the read image G (i.e., areas other than base S2) can be eliminated to improve the image quality of the output image. Detection of the left side base S3 is accomplished by lighting lamp 45a and maintaining lamp 45b in the OFF state.

Figure 11:
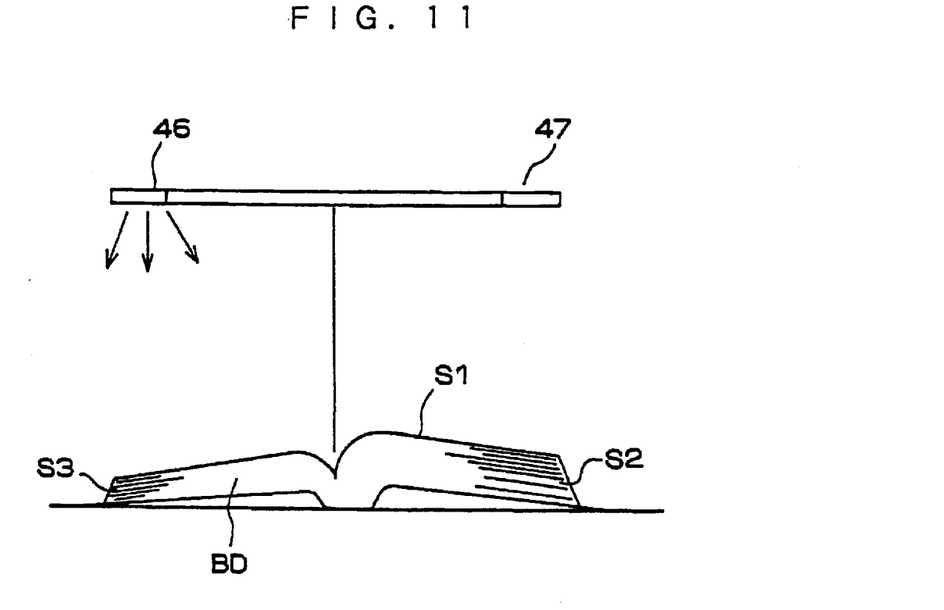
FIG. 11 illustrates another method of detecting the base of a book document.
Figure 12:
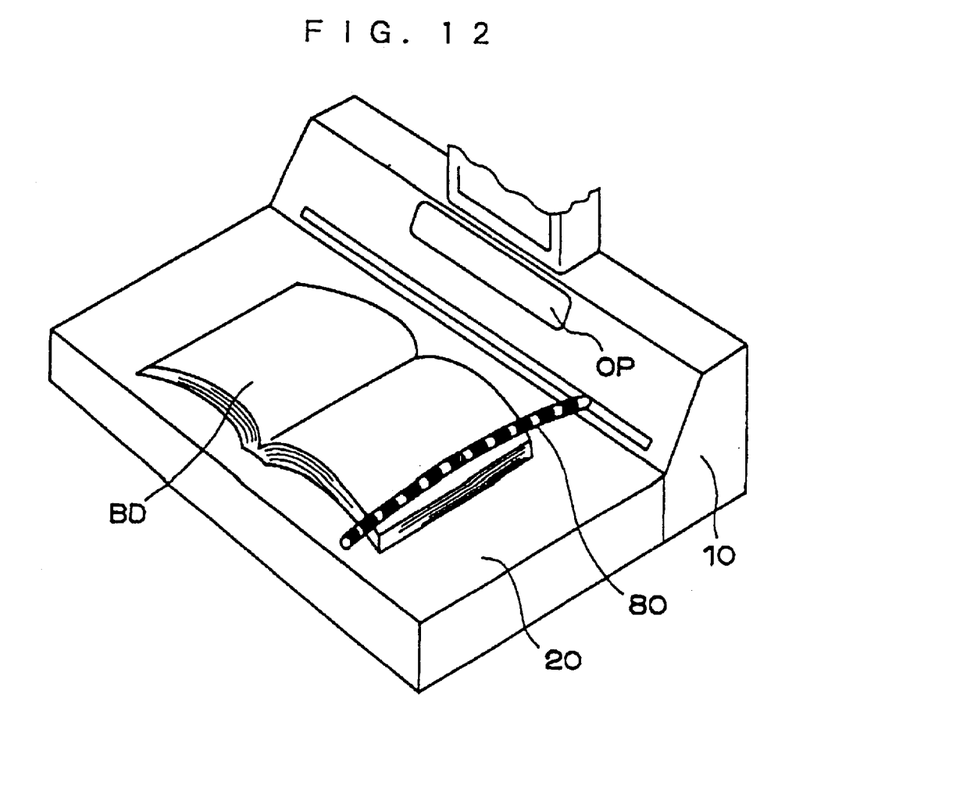
FIG. 12 is a perspective view showing a book scanner provided with a document holder.

Line sensor 31 may be used to detect bases S2 and S3, or a special image sensing device may be used. When line sensor 31 is used, a prescan is performed to detect the base prior to reading of the image, or the base is detected at the same time as the image is read. In either case, image processing is performed to eliminate unnecessary image data as the reading is accomplished. As shown in FIG. 11, light sources 46 and 47 may be provided for base detection to illuminate only the proximate edge of bases S2 and S3. Detection of an unnecessary image is simplified when a document holder 80 is mounted on housing 10 to maintain the open state of the book document, as shown in FIG. 12. That is, the position of document holder 80 is detected, and the image of document holder 80 and images on the exterior side thereof within the read image are eliminated. Furthermore, an actual reading area can be optionally set by a user changing the position of the document holder 80. That is, the document holder 80 functions as an editing area specifying means.

According to the present invention, document images can be read in parallel with the measurement of the state of curvature of the document surface, and image distortion caused by said curvature can be corrected in real time.

According to the second embodiment, measurement precision can be improved by reducing the illumination range of light used to measure the state of curvature without using a special lens.

According to the third embodiment, the quality of the read image can be improved without increasing the image processing load.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reader comprising:

a light source which emits a light;

light dividing means for dividing said light between an infrared light and a visible light;

a first optical device which leads said visible light to an entire reading area of a document surface;

image reading means for reading the document image formed by said visible light and outputting image data corresponding to the document image;

a second optical device which leads said infrared light to said document surface;

detecting means for detecting the infrared light reflected by the document surface and for judging curvatures of the document surface; and image processing means for correcting the image data output by said image reading means in accordance with the curvatures of the document surface detected by said detecting means while said image reading means reads the document image.

2. An image reader according to claim 1, wherein said image reading means is a line sensor, and moves relatively to the document image in a predetermined direction.

3. An image reader according to claim 1 further comprising:

a light shield having a pinhole which is provided in the optical path of the infrared light, wherein said light shield moves with said image reading means in the predetermined direction.

4. An image reader according to claim 1, wherein said detecting means is provided with at least three area sensors provided at each division area of a divided reading area in a single direction, and wherein the detection resolution of an area sensor reading the center area is higher than that of the other area sensors.

5. An image reader according to claim 1, wherein said light dividing means is provided with a slit-like window to transmit said infrared light, so as to direct infrared light emitted from said second optical means transmitted through said window to said document surface.

6. An image reader according to claim 1, wherein said light dividing means is provided with slit-like windows to transmit said infrared light, so as to direct said infrared light emitted from said second optical means transmitted through said windows to said document surface.

7. An image reader according to claim 1, wherein said image processing means corrects an image distortion of the document image caused by the curvatures of the document surface.

8. An image reader according to claim 7, wherein said image distortion correction is a process for correcting the document image to an image assuming the document surface is flat.

9. An image reader comprising:

a light source which emits a light;

light dividing means for dividing said light between an infrared light and a visible light;

a first optical device which leads said visible light to an entire reading area of a document surface;

image reading means for reading a document image formed by said visible light and outputting image data corresponding to an image of the document;

an image forming lens which forms the document image on the image reading means;

a second optical device which leads said infrared light to said document surface;

detecting means for detecting the infrared light reflected by the document surface and for judging curvatures of the document surface; and focus adjusting means for adjusting a focus of document image formed on the image reading means in accordance with the curvatures of the documented surface detected by said detecting means while said image reading means reads the document image.

10. An image reader according to claim 9, wherein said image reading means is a line sensor, and moves relatively to the document image in a predetermined direction.

11. An image reader according to claim 10 further comprising:

a light shield having a pinhole which is provided in the optical path of the infrared light, wherein said light shield moves with said image reading means in the predetermined direction.

12. An image reader according to claim 9, wherein said focus adjusting means moves said image forming lens.

13. An image reader according to claim 9, wherein said detecting means is provided with at least three area sensors provided at each division area of a divided reading area in a single direction, and wherein the detection resolution of an area sensor reading the center area is higher than that of the other area sensors.

14. An image reader according to claim 9, wherein said light dividing means is provided with a slit-like window to transmit said infrared light, so as to direct infrared light emitted from said second optical means transmitted through said window to said document surface.

15. An image reader according to claim 9, wherein said light dividing means is provided with slit-like windows to transmit said infrared light, so as to direct said infrared light emitted from said second optical means transmitted through said windows to said document surface.

16. An image reader comprising:

a light source which emits a light including a visible light and an infrared light;

a first filter which blocks the infrared light;

a second filter which blocks the visible light;

a first mirror which leads said visible light to an entire reading area of a document surface;

image reading means for reading the document image formed by said visible light and outputting image data corresponding to the document image;

a second mirror which leads said visible light reflected by said document surface to said image reading means and leads said infrared light to said document surface;

detecting means for detecting the infrared light reflected by the document surface and for judging curvatures of the document surface; and image processing means for correcting the image data output by said image reading means in accordance with the curvatures of the document surface detected by said detecting means while said image reading means reads the document image.

17. An image reader according to claim 16, wherein said image reading means is a line sensor, and moves relatively to the document image in a predetermined direction.

18. An image reader according to claim 17 further comprising:

a light shield having a pinhole which is provided in the optical path of the infrared light, wherein said light shield moves with said image reading means in the predetermined direction.

19. An image reader according to claim 16, wherein said detecting means is provided with at least three area sensors provided at each division area of a divided reading area in a single direction, and wherein the detection resolution of a area sensor reading the center area is higher than that of the other area sensors.

20. An image reader according to claim 16, wherein said second filter is provided with a slit-like window to transmit said infrared light, so as to direct infrared light emitted from said second optical means transmitted through said window to said document surface.

21. An image reader according to claim 16, wherein said second filter is provided with slit-like windows to transmit said infrared light, so as to direct said infrared light emitted from said second optical means transmitted through said windows to said document surface.

22. An image reader according to claim 16, wherein said image processing means corrects an image distortion of the document image caused by the curvatures of the document surface.

23. An image reader according to claim 22, wherein said image distortion correction is a process for correcting the document image to an image assuming the document surface is flat.

24. An image reader comprising:

a light source which emits a light including a visible light and an infrared light;

a first filter which blocks the infrared light;

a second filter which blocks the visible light;

a first mirror which leads said visible light to an entire reading area of a document surface;

image reading means for reading the document image formed by said visible light and outputting image data corresponding to the document image;

an image forming lens which forms the document image on the image reading means;

a second mirror which leads said visible light reflected by said document surface to said image reading means and leads said infrared light to said document surface;

detecting means for detecting the infrared light reflected by the document surface and for judging curvatures of the document surface; and focus adjusting means for adjusting a focus of document image formed on the image reading means in accordance with the curvatures of the document surface detected by said detecting means while said image reading means reads the document image.

25. An image reader according to claim 24, wherein said focus adjusting means moves said image forming lens.

26. An image reader according to claim 24, wherein said image reading means is a line sensor, and moves relatively to the document image in a predetermined direction.

27. An image reader according to claim 26 further comprising:

a light shield having a pinhole which is provided in the optical path of the infrared light, wherein said light shield moves with said image reading means in the predetermined direction.

28. An image reader according to claim 24, wherein said detecting means is provided with at least three area sensors provided at each division area of a divided reading area in a single direction, and wherein the detection resolution of an area sensor reading the center area is higher than that of the other area sensors.

29. An image reader according to claim 24, wherein said second filter is provided with a slit-like window to transmit said infrared light, so as to direct infrared light emitted from said second optical means transmitted through said window to said document surface.

30. An image reader according to claim 24, wherein said second filter is provided with slit-like windows to transmit said infrared light, so as to direct said infrared light emitted from said second optical means transmitted through said windows to said document surface.

* * * * *

UNITED STATES PATENT AND TRADEMARK OFFICE
CERTIFICATE OF CORRECTION

PATENT NO. : 5,886,342
DATED : March 23, 1999
INVENTOR(S) : Toru Matsui

It is certified that error appears in the above-identified patent and that said Letters Patent is hereby corrected as shown below:

Title page:
Section [73], change "Matsushita Electric Industrial Co., Ltd." to -- Minolta Co., Ltd. --.

Signed and Sealed this

Twenty-eighth Day of August, 2001

Attest:

NICHOLAS P. GODICI

Attesting Officer

Acting Director of the United States Patent and Trademark Office